March 31, 1970  E. E. JAMES  3,503,648
GLOVE BOX COMPARTMENT FOR A MOTOR VEHICLE
Filed July 17, 1968  2 Sheets-Sheet 2

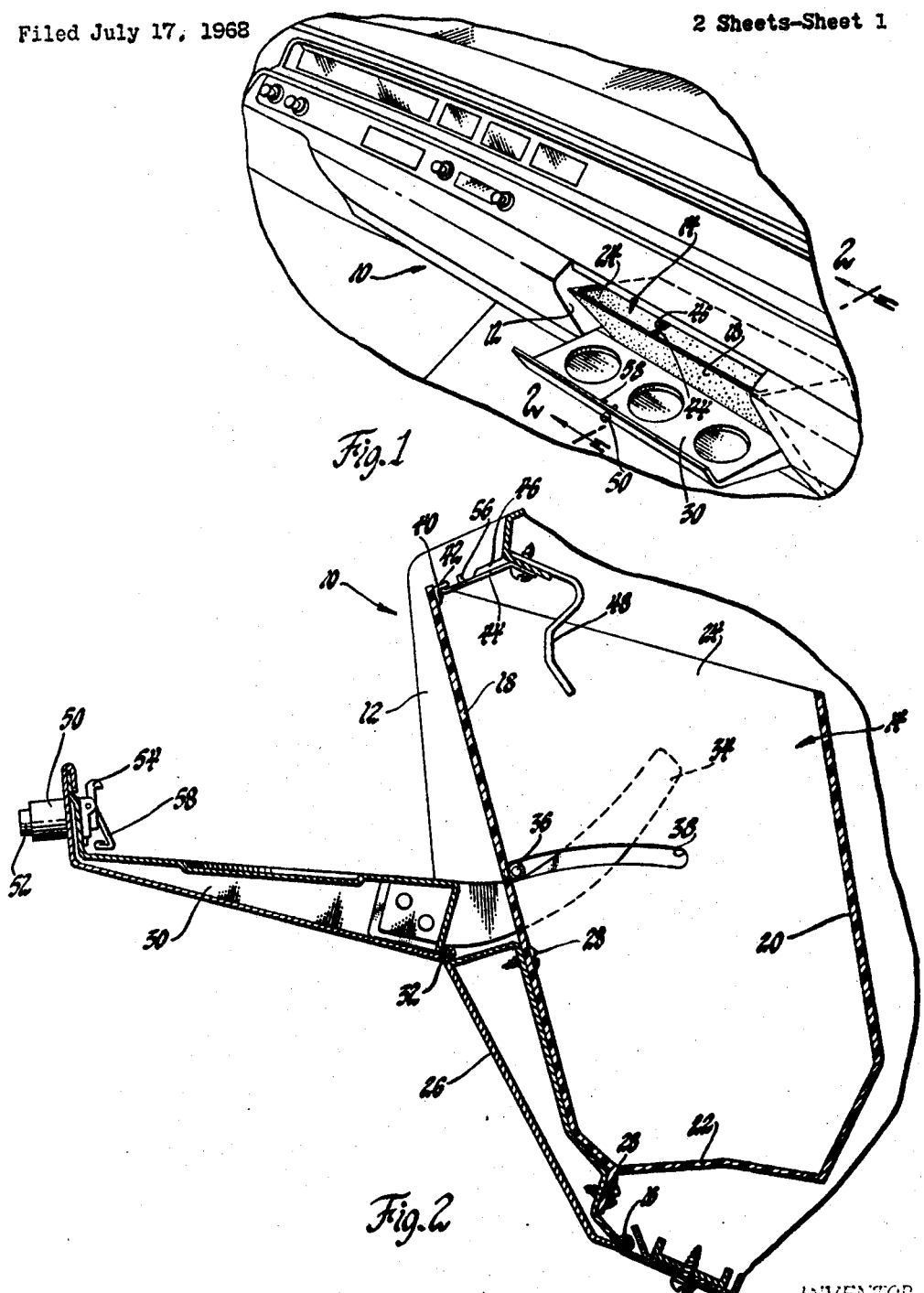

INVENTOR.
Edward E. James
BY
W. S. Pettigrew
ATTORNEY

United States Patent Office 3,503,648
Patented Mar. 31, 1970

3,503,648
GLOVE BOX COMPARTMENT FOR A MOTOR VEHICLE
Edward E. James, Silver Spring, Md., assignor to General Motors Corporation, Detroit, Mich., a corporation of Delaware
Filed July 17, 1968, Ser. No. 745,591
Int. Cl. B60r 7/06
U.S. Cl. 296—37         5 Claims

ABSTRACT OF THE DISCLOSURE

A pivotally mounted bin-type, open-topped glove box receptacle movable between a stored position wherein the open top is inaccessible through the glove box access opening, and an extended position wherein at least a part of the open top projects outside the access opening. A closure member is hingedly mounted on the front wall of the receptacle generally midway between the upper and lower edges thereof for movement relative to the receptacle between a first position in juxtaposition with the front wall of the receptacle and a second, generally horizontal tray-holding position in a plane angular to the plane of said front wall. A control cam projects from the closure member for engagement with a stationary follower, whereby the closure member is held in a substantially horizontal position regardless of the position of the receptacle.

---

This invention relates to a storage compartment for a vehicle body, and more particularly to a glove box compartment comprising an open-topper receptacle pivotally movable between a body-stored, closed position and an extended, open position. The receptacle carries a closure member which may be swung into a horizontal tray-holding position regardless of the position of the receptacle.

The dash or instrument panel of an automobile conventionally has an opening for access to a glove box compartment located inwardly (forwardly) of the panel. The opening is normally closed by a door mounted on the panel for swinging movement relative thereto. For convenience, glove box doors are often hinged for swinging movement to a fully open, horizontal position wherein the horizontal surface of the door may be used as a shelf or service tray to support refreshments, maps, or the like. When the door is open, articles stored in the glove box are exposed and often fall out of the open compartment, particularly when the vehicle is in motion.

Pivoted bin-type receptacles prevent the glove box compartment from being open when the closure member is open. An arrangement of this type is shown and described in the copending application of George Drach, Jr., Ser. No. 570,287, filed Aug. 4, 1966. This invention provides an improvement over the structure shown in Drach, particularly in that the closure member which may swing down to provide a horizontal tray is of less height than the height of the glove compartment access opening, thereby eliminating interference with the knees of a passsenger sitting on the front seat opposite the glove box.

One feature of the invention is that it provides an improved glove box arrangement; another feature of the invention is that it provides a glove box arrangement including an open-topped receptacle pivotally movable between stored position in the glove box compartment and extended position, and a closure member hingedly mounted on the front wall of the receptacle above the lower edge thereof for movement between a first position in juxtaposition with the front wall of said receptacle and a second generally horizontal tray-holding position in a plane angular to the plane of said front wall. A further feature of the invention is that control means are provided for holding the closure member in a generally horizontal position regardless of the position of the receptacle.

Other features and advantages of the invention will be apparent from the following description, having reference to the drawings in which:

FIGURE 1 is a fragmentary perspective view illustrating a vehicle instrument panel embodying the invention and showing the glove box receptacle in stored position and the closure member in tray-holding position;

FIGURE 2 is an enlarged fragmentary sectional view taken along the line 2—2 of FIGURE 1;

Figures 3, 4:
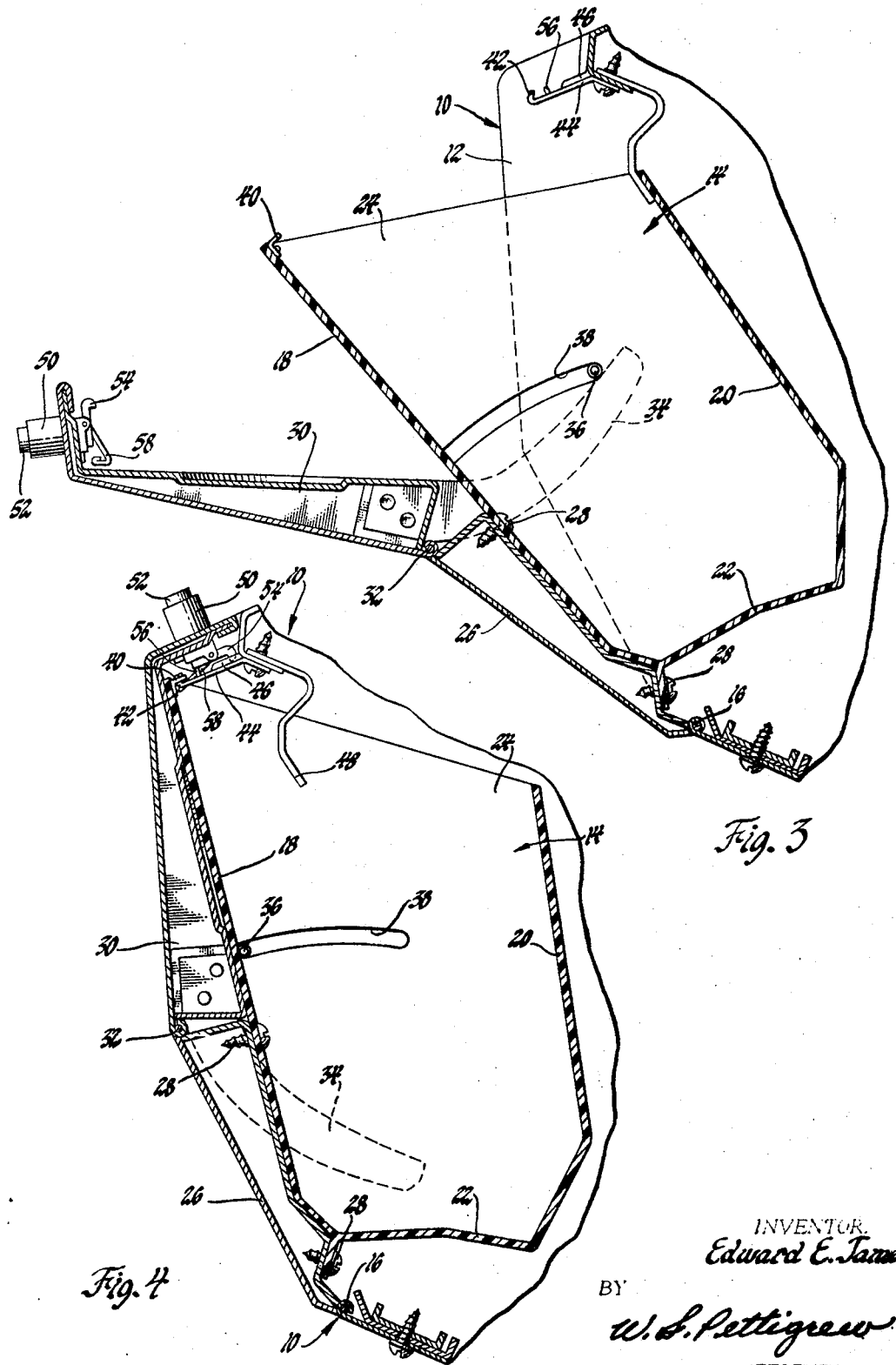
FIGURE 3 is a sectional view similar to FIGURE 2 but showing the receptacle in extended position.
FIGURE 4 is a similar sectional view showing the receptacle in stored position and the closure member in closed position.

Referring now more particularly to the drawings, an instrument panel designated generally as 10 extends transversely across an automobile body forwardly of the front seat thereof. In front of the front passenger's seat, the instrument panel is formed with an opening 12 for housing a glove box compartment. An open-topped receptacle designated generally as 14 is pivotally mounted along its lower front edge at 16 on the instrument panel 10 for pivotal movement between a stored position in said compartment as shown in FIGURES 1, 2, and 4, and an extended position as shown in FIGURE 3. When in stored position, the open top of the receptacle is substantially inaccessible through the access opening 12 as shown in FIGURE 4. When in extended position, at least a part of the open top projects outside the compartment access opening 12 as shown in FIGURE 3. The receptacle has a front wall 18, a back wall 20, and a bottom wall 22. Side walls connecting the front, back and bottom walls are also provided, one of said side walls being illustrated at 24. The bottom portion of the front wall 18 of the receptacle carries an ornamental cover plate 26 which is rigidly secured to the front wall 18 by screws 28. In the structure shown, the cover plate 26 extends approximately half way up the height of the front wall 18. The exact extent of the cover plate in this regard is not critical.

A closure member 30 is hingedly mounted on a horizontal axis 32 along the top edge of the rigid cover plate 26 which forms an integral part of the front wall of the receptacle. While the exact location is not critical, the hinge mounting 32 is shown at a location generally midway between the upper and lower edges of said front wall. The location of the hinge axis preferably is chosen with regard to the height of the glove compartment above the automobile floor, the vertical dimension of the front wall 18 of the receptacle, and the spacial relationship of the front passenger seat to the glove box compartment so that maximum knee room for the front seat passenger may be provided. The closure member 30 is pivotally movable relative to the receptacle 14 between a first position (FIGURE 4) in juxtaposition with said front wall 18 and a second generally horizontal tray-holding position (FIGURES 1, 2, and 3) in a plane angular to the plane of the front wall 18.

Control means for maintaining the closure member 30 generally horizontal when in its second position regardless of the position of the receptacle comprises a curved cam arm 34 projecting from the closure member. When the closure member is in its horizontal tray-holding position, the curved upper surface of the cam 34 engages a follower 36 which is mounted on and extends parallel to the inner surface of the panel 10 and projects into the opening 12 through a curved slot 38 in the end wall 24 of the receptacle. Preferably, similar cams and followers are provided at each end of the closure member 30. The curvature of the upper surface of the cam 34 together with the spacial relationship between this surface and the hinge axis 32 is such that when the closure member is in its open position it remains generally horizontal regardless of the position of the receptacle 14.

Releasable means are provided for latching the receptacle 14 in stored position independently of the position of the closure 30; for latching the closure 30 to the panel 10 to hold the closure 30 and the receptacle 14 in closed position; and for latching the closure member 30 to the receptacle 14 when the receptacle 14 is in open position. A rigid catch 40 projects forwardly from the upper edge of the front wall 18 adjacent the center thereof. The catch 40 has an opening formed in it adapted to receive an upwardly projecting tang 42 formed on a spring latching tongue 44 which projects rearwardly from the panel 10 at the top edge of the access opening 12 adjacent the center thereof. As shown in FIGURE 2, the catch 40 and tang 42 may be engaged to hold the receptacle in closed position when the closure member 30 is in its tray-holding position. The receptacle may be moved from the position of FIGURE 2 to the position of FIGURE 3 by finger pressure to depress the spring latching tongue 44.

A second rigid catch member 46 overlies the forward portion of the latching tongue 44 and is formed with an opening for engagement by a latch on the closure member 30. This latch comprises a pushbutton operated latch device 50 which is mounted on the free swinging edge of the closure member 30 adjacent the center thereof and which carries a spring pressed pushbutton 52 which, upon depression, swings a pivotally mounted latch member 54 in a counterclockwise direction. As shown in FIGURE 4, the latch member 54 is adapted to engage the catch member 46 to hold the closure member 30 and the receptacle 14 in the position illustrated therein. A release tab 56 projects upwardly from the upper surface of the spring tongue 44. Upon depression of the pushbutton 52 to swing the latch member 54 in a counterclockwise direction, the tail of the latch member 54 moves against the release tab 56 to depress the spring tongue 44 to move the tang 42 out of latching engagement with the catch 40. Simultaneously the latch 54 moves out of latching engagement with the catch 46. With the pushbutton 52 depressed, the receptacle 14 may be swung from the retracted position of FIGURE 4 to the extended position of FIGURE 3. A stop 48 projects from the panel 10 into the opening 12 for engagement by the upper portion of the rear wall 20 of the receptacle 14 to limit opening movement thereof.

A spring detent 58 is carried by the pushbutton assembly 50 spaced laterally from the pivoted latch 54. This detent is adapted to snap over the upper edge of the front wall 18 of the receptacle 14 when the closure 30 is in the position of FIGURE 4 to provide releasable means for holding the closure in the position of FIGURE 4. In order to move the closure to the position of FIGURES 2 and 3, the free upper edge of the closure is simply pulled away from the receptacle so that the spring detent 58 snaps free from the receptacle, permitting independent swinging movement of the receptacle and the closure.

While I have shown and described one embodiment of my invention, it is capable of many modifications. Changes, therefore, in the construction and arrangement may be made without departing from the spirit and scope of the invention as set forth in the appended claims.

What is claimed is:

1. In combination with a vehicle body panel having a compartment access opening, an open-topped receptacle pivotally mounted on said panel and movable between a stored position in said compartment wherein said open top is substantially inaccessible through said access opening and an extended position wherein at least a part of said open top projects outside said compartment access opening, said receptacle having front, back, and bottom walls which are fixed relative to each other, said front wall substantially closing the access opening when the receptacle is in stored position; a closure member hingedly mounted on the front wall of said receptacle above the lower edge thereof for movement relative to said receptacle between a first position in juxtaposition with said front wall and a second generally horizontal tray-holding position in a plane angular to the plane of said front wall; control means for maintaining said closure member generally horizontal when in said second position regardless of the position of said receptacle; and releasable means latching said receptacle in said stored position.

2. Apparatus of the character claimed in claim 1, including further releasable means for latching said closure member to said receptacle in said first position with respect thereto.

3. Apparatus of the character claimed in claim 1, wherein said last-mentioned means latches said closure and said receptacle to said panel and includes a common release for both latches.

4. Apparatus of the character claimed in claim 1, wherein said control means includes a cam projecting from said closure member for engagement with a stationary follower mounted on said panel.

5. In combination with a vehicle body panel having a compartment access opening, an open-topped receptacle pivotally movable between a stored position in said compartment wherein said open top is substantially inaccessible through said access opening and an extended position wherein at least a part of said open top projects outside said compartment access opening, said receptacle having front, back, and bottom walls which are fixed relative to each other, said front wall substantially closing the access opening when the receptacle is in stored position; means mounting said receptacle on said panel for pivotal movement between said stored and extended positions; a closure member hingedly mounted on a horizontal axis on the front wall of said receptacle generally midway between the upper and lower edges thereof for movement relative to said receptacle between a first position in juxtaposition with said front wall and a second generally horizontal tray-holding position in a plane angular to the plane of said front wall; releasable means for latching said closure member to said receptacle and in said first position with respect thereto; control means for maintaining said closure member generally horizontal when in said second position regardless of the position of said receptacle, comprising a curved cam projecting from said closure member for engagement with a stationary follower on said panel; and releasable means latching said closure and said receptacle to said panel, said releasable means including a common release for both latches.

References Cited

UNITED STATES PATENTS 3,386,765   8/1966   Drach _____ 296—37

PHILIP GOODMAN, Primary Examiner

U.S. Cl. X.R.

312—291